(12) United States Patent
Prakash (10) Patent No.: US 9,979,218 B2
(45) Date of Patent: May 22, 2018

(54) LPS ARCHITECTURE FOR UPS SYSTEMS

(71) Applicant: SCHNEIDER ELECTRIC IT CORPORATION, West Kingston, RI (US)

(72) Inventor: Indra Prakash, Bihar (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 176 days.

(21) Appl. No.: 15/035,475

(22) PCT Filed: Nov. 22, 2013

(86) PCT No.: PCT/US2013/071393
§ 371 (c)(1),
(2) Date: May 9, 2016

(87) PCT Pub. No.: WO2015/076819
PCT Pub. Date: May 28, 2015

(65) Prior Publication Data
US 2016/0352127 A1 Dec. 1, 2016

(51) Int. Cl.
*H02J 7/00* (2006.01)
*H02J 9/06* (2006.01)

(52) U.S. Cl.
CPC ............ *H02J 7/0068* (2013.01); *H02J 9/062* (2013.01); *H02J 2009/067* (2013.01)

(58) Field of Classification Search
None
See application file for complete search history.

(56) References Cited

U.S. PATENT DOCUMENTS 3,778,634 A 12/1973 Hanrihan
4,010,381 A 3/1977 Fickenscher et al.
(Continued)

FOREIGN PATENT DOCUMENTS

CN 102893492 A 1/2013
DE 43 42 327 A1 7/1994
(Continued)

OTHER PUBLICATIONS

All About Circuits, Phasing: Transformers, Dec. 27, 2011 (Dec. 27, 2011) [retrieved on Oct. 13, 2013] Retrieved from the Internet: <URL:http://web.archive.org/web/20111227123255/http://www.allaboutcircuits.com/vol_2/chpt_9/4.html> pp. 1-3.
(Continued)

*Primary Examiner* — Cassandra Cox
(74) *Attorney, Agent, or Firm* — Lando & Anastasi, LLP (57) ABSTRACT

At least some embodiments herein provide a UPS comprising an input, a transformer including at least one primary winding, a relay, a sense circuit, and a current control circuit, wherein the sense circuit is configured to monitor input power, control the relay to couple, in a first mode, the input to the at least one primary winding when input power is above an input threshold, and control the relay to decouple, in a second mode, the input from the at least one primary winding when input power is below the input threshold, and wherein the current control circuit is configured, in the first mode, to control current from an AC source through the at least one primary winding to generate an output voltage and, in the second mode, to control current from a DC source through the at least one primary winding to generate the output voltage.

20 Claims, 4 Drawing Sheets

(56) References Cited

U.S. PATENT DOCUMENTS

| | | |
|---|---|---|
| 4,564,767 A | 1/1986 | Charych |
| 4,713,553 A | 12/1987 | Townsend et al. |
| 4,916,329 A | 4/1990 | Dang et al. |
| 5,029,285 A | 7/1991 | Bobry |
| 5,315,533 A | 5/1994 | Stich et al. |
| 5,602,462 A | 2/1997 | Stich et al. |
| 5,760,495 A | 6/1998 | Mekanik |
| 5,781,422 A | 7/1998 | Lavin et al. |
| 5,982,652 A | 11/1999 | Simonelli et al. |
| 7,259,476 B2 | 8/2007 | Frey |
| 7,446,433 B2 | 11/2008 | Masciarelli et al. |
| 7,939,968 B2 | 5/2011 | Hjort et al. |
| 8,203,235 B2 | 6/2012 | Fox et al. |
| 8,896,152 B2 | 11/2014 | Beg et al. |
| 2002/0140403 A1 | 10/2002 | Reddy |
| 2004/0036449 A1 | 2/2004 | Bean et al. |
| 2004/0223347 A1 | 11/2004 | Kobayashi et al. |
| 2005/0168073 A1 | 8/2005 | Hjort |
| 2006/0043797 A1 | 3/2006 | Hjort et al. |
| 2010/0045107 A1 | 2/2010 | Cohen et al. |
| 2010/0201194 A1 | 8/2010 | Masciarelli et al. |
| 2011/0095727 A1* | 4/2011 | Yeh .................. H02J 9/062 320/138 |
| 2011/0278932 A1 | 11/2011 | Navarro et al. |
| 2012/0217809 A1 | 8/2012 | Sato et al. |
| 2014/0150186 A1 | 6/2014 | Metten et al. |
| 2016/0111917 A1 | 4/2016 | Ghosh et al. |

FOREIGN PATENT DOCUMENTS

| | | |
|---|---|---|
| KR | 10-2010-0131342 | 12/2010 |
| NL | 7604353 A | 10/1976 |
| WO | 9205614 A1 | 4/1992 |
| WO | 2009126405 A2 | 10/2009 |
| WO | 2010/070676 A2 | 6/2010 |
| WO | 2013023855 A2 | 2/2013 |
| WO | 20140193362 A1 | 12/2014 |

OTHER PUBLICATIONS

Notification of Transmital of the International Search Report and the Written Opinion of the International Searching Authority from corresponding PCT/US2013/071393 dated Apr. 14, 2014.

Van Roo, Transistor Tutorial, Part 10: Metal Oxide Semiconductor Field Effect Transistors, 2005 [retrieved on Oct. 13, 2013] Retrieved from the Internet: <URL:http://www.sentex.ca/-mec1995/tutorial/xtor/xtor10/xtor10.html>, pp. 1-8.

* cited by examiner

LPS ARCHITECTURE FOR UPS SYSTEMS

CROSS-REFERENCE TO RELATED APPLICATIONS

This application is a U.S. National Stage Application under 35 U.S.C. § 371 of International Application No. PCT/US2013/071393, filed Nov. 22, 2013, titled LPS ARCHITECTURE FOR UPS SYSTEMS, which is hereby incorporated herein by reference in its entirety.

BACKGROUND OF INVENTION

1. Field of Invention

At least some embodiments described herein relate generally to Logic Power Supply (LPS) systems within Uninterruptible Power Supplies (UPS).

2. Discussion of Related Art

Logic Power Supply (LPS) systems typically provide required bias power to different subsystems (e.g., a Digital Signal Processor (DSP), microcontroller, control and communication systems, gate driver, etc) of an Uninterruptible Power Supply (UPS).

SUMMARY OF INVENTION

At least one aspect of the invention is directed to an Uninterruptible Power Supply (UPS) system, the UPS system comprising an input configured to be coupled to an AC power source, a transformer including at least one primary winding configured to be coupled to a DC power source, and at least one secondary winding, a relay configured to selectively couple the input to the at least one primary winding, a sense circuit coupled to the input and the relay, a current control circuit coupled to the at least one primary winding, and at least one output line coupled to the at least one secondary winding, wherein the sense circuit is configured to monitor a level of input AC power at the input, determine whether the level of input AC power is above an input power threshold level, control the relay to couple, in a first mode of operation of the UPS, the input to the at least one primary winding in response to a determination that the input AC power is above the input power threshold level, and control the relay to decouple, in a second mode of operation of the UPS, the input from the at least one primary winding in response to a determination that the input AC power is below the input power threshold level, and wherein the current control circuit is configured, in the first mode of operation of the UPS, to control current from the AC power source through the at least one primary winding to generate an output voltage at the at least one output line and, in the second mode of operation of the UPS, to control current from the DC power source through the at least one primary winding to generate the output voltage at the at least one output line. In one embodiment, the transformer is a flyback transformer.

According to one embodiment, the at least one primary winding of the transformer includes a first primary winding selectively coupled to the input via the relay, and a second primary winding configured to be coupled to the DC source via a DC line. In one embodiment, the relay is configured to selectively couple the input to the first primary winding, the sense circuit is configured, in the first mode of operation of the UPS, to control the relay to couple the input to the first primary winding, and the current control circuit is configured, in the first mode of operation of the UPS, to control current from the AC power source through the first primary winding to generate the output voltage at the at least one output line. In another embodiment, the sense circuit is configured, in the second mode of operation of the UPS, to control the relay to decouple the input from the first primary winding, and the current control circuit is configured, in the second mode of operation of the UPS, to control current from the DC power source through the second primary winding to generate the output voltage at the at least one output line.

According to another embodiment, the UPS system further comprises a current limit changing circuit configured to be coupled between the DC power source and the transformer, wherein the current control circuit is further configured to operate the current limit changing circuit to adjust a current limit of the transformer in the second mode of operation of the UPS.

According to one embodiment, the UPS system further comprises a controller coupled to the DC line, a converter coupled to the input, an inverter coupled to the converter via a DC bus, and a battery charger coupled to the DC bus and the DC line, wherein the DC power source is a battery coupled to the DC line, wherein the battery charger is configured to provide DC power from the DC bus to the battery and DC line, and wherein the controller is configured to monitor a voltage level of the DC line and, in response to determining that the voltage level of the DC line is above a DC line voltage threshold, to operate the sense circuit to drive the UPS into the second mode of operation.

According to another embodiment, the UPS system further comprises a DC bus line coupled between the DC bus and the first primary winding, and a switch configured to selectively couple the battery and battery charger to the second primary winding, wherein, in a third mode of operation of the UPS, the controller is further configured, in response to determining that the voltage level of the DC line is below the DC line voltage threshold, to operate the switch to decouple the battery and battery charger from the second primary winding, and wherein, in the third mode of operation of the UPS, the current control circuit is further configured to control current from the DC bus line through the first primary winding to generate the output voltage at the at least one output line.

According to one embodiment, the UPS system further comprises a neutral line selectively coupled to the input via the relay and selectively coupled to the input via a neutral backfeed relay, wherein in the second mode of operation of the UPS, the sense circuit is configured to control the relay to decouple the input from the neutral line, and wherein in the second mode of operation of the UPS, the controller is configured to control the neutral backfeed relay to couple the input to the neutral line. In one embodiment, the neutral backfeed relay is also selectively coupled between the input and the converter.

According to another embodiment, the UPS system further comprises a manual switch coupled to the switch, wherein the manual switch is configured to operate the switch to couple the battery and battery charger to the second primary winding in response to a user activating the manual switch.

According to one embodiment, the sense circuit comprises a sense transformer coupled to the input and configured to receive the input AC power and generate an AC input power sense signal related to the input AC power. In one embodiment, the sense circuit further comprises a first rectifier coupled to the sense transformer and configured to rectify the AC input power sense signal into a rectified signal, and a voltage regulator coupled to the first rectifier and the relay and configured to generate a supply voltage based on the rectified signal and provide the supply voltage to the relay. In another embodiment, the sense circuit further comprises a second rectifier coupled to the input and configured to rectify the input AC power into a rectified input power sense signal, an amplifier coupled to the second rectifier and configured to generate an input reference signal based on the rectified input power sense signal, and a comparator coupled to the amplifier and configured to compare the input reference signal to the input power threshold level and provide a relay control signal to the relay to operate the relay to couple the input to the at least one primary winding in response to a determination that the input reference signal is above the input power threshold level. In another embodiment, the comparator is further configured to provide the relay control signal to the relay to operate the relay to decouple the input from the at least one primary winding in response to a determination that the input reference signal is below the input power threshold level. In one embodiment, the at least one output line is coupled to the relay and configured to provide the output voltage to the relay.

Another aspect of the invention is directed to a method for providing DC power within a UPS system comprising an input configured to be coupled to an AC power source, and a transformer including a first primary winding configured to be coupled to the AC power source, a second primary winding configured to be coupled to a DC power source, and at least one secondary winding coupled to at least one output line, the method comprising monitoring a level of input AC power at the input, determining, with a sense circuit coupled to the input, whether the level of input AC power is above an input power threshold, coupling, in a first mode of operation of the UPS, the input to the first primary winding in response to a determination by the sense circuit that the input AC power is above the input power threshold, decoupling, in a second mode of operation of the UPS, the input from the first primary winding in response to determination by the sense circuit that the input AC power is below the input power threshold, controlling current, in the first mode of operation of the UPS, from the AC power source through the first primary winding to generate an output voltage at the at least one output line; and controlling current, in the second mode of operation of the UPS, from the DC power source through the second primary winding to generate the output voltage at the at least one output line. In one embodiment, the method further comprises adjusting a current limit of the transformer in the second mode of operation of the UPS.

According to one embodiment, the UPS system further comprises a converter coupled to the input, an inverter coupled to the converter via a DC bus, and a battery charger coupled to the DC bus, wherein the DC power source is a battery coupled to the battery charger, and the method further comprises monitoring a level of voltage provided by the battery and the battery charger to the second primary winding, determining whether the level of voltage provided by the battery and the battery charger to the second primary winding is above a DC voltage threshold, and operating the UPS in the second mode of operation in response to a determination that the level of voltage provided by the battery and the battery charger to the second primary winding is above the DC voltage threshold. In another embodiment, the method further comprises operating the UPS in a third mode of operation in response to a determination that the level of voltage provided by the battery and the battery charger to the second primary winding is below the DC voltage threshold, and controlling, in the third mode of operation of the UPS, current from the DC bus through the first primary winding to generate the output voltage at the at least one output line.

One aspect of the invention is directed to an Uninterruptible Power Supply (UPS), the UPS comprising an input configured to be coupled to an AC mains supply, a converter coupled to the input, an inverter coupled to the converter with a DC bus, a battery charger coupled to the DC bus, a DC power source coupled to the battery charger, a transformer coupled to the AC mains supply, the DC power source, and the DC bus, and means for selecting one of the AC mains supply, the DC power source, and the DC bus to provide power to the transformer and for generating an output DC voltage with the transformer based on the power received from the selected one of the AC mains supply, the DC power source, and the DC bus.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Various embodiments and aspects thereof will now be discussed in detail with reference to the accompanying drawings. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, LPS systems typically provide required bias power to different subsystems (e.g., a DSP processor, microcontroller, control and communication systems, gate driver, etc) of an Uninterruptible Power Supply (UPS). Common LPS systems utilize a full capacity converter (including a transformer) to provide the required LPS bias power. The full capacity converter typically receives DC power from either a battery charger within the UPS or from another full capacity converter (including another transformer) which is coupled to AC mains. The use of two full capacity converters (including two separate transformers) in a UPS may be costly, inefficient, and/or overly complex.

Another common approach is to power a single LPS system via two power sources (mains and battery). However, this approach may be limited in that the available line and battery voltages must be compatible with each other (i.e., relatively the same). This approach may also be limited due to the standard neutral backfeed relay included in a common double conversion UPS. In a common double conversion UPS, a pair of backfeed relays (e.g., positive and neutral) is typically included to isolate the UPS from input mains during back-up/battery/failure mode of operation. The neutral backfeed relay is configured to disconnect the negative terminal of the battery from mains neutral during back-up/battery/failure mode of operation. This may result in a LPS system which is only capable of being powered from one of mains or battery at a given time.

A new LPS architecture is described herein which addresses the above issues. The LPS architecture can be powered from line as well as battery, with the presence of a backfeed relay, and with wide ranging battery and mains voltages (e.g., 48V battery and 230V mains).

Figure 1:
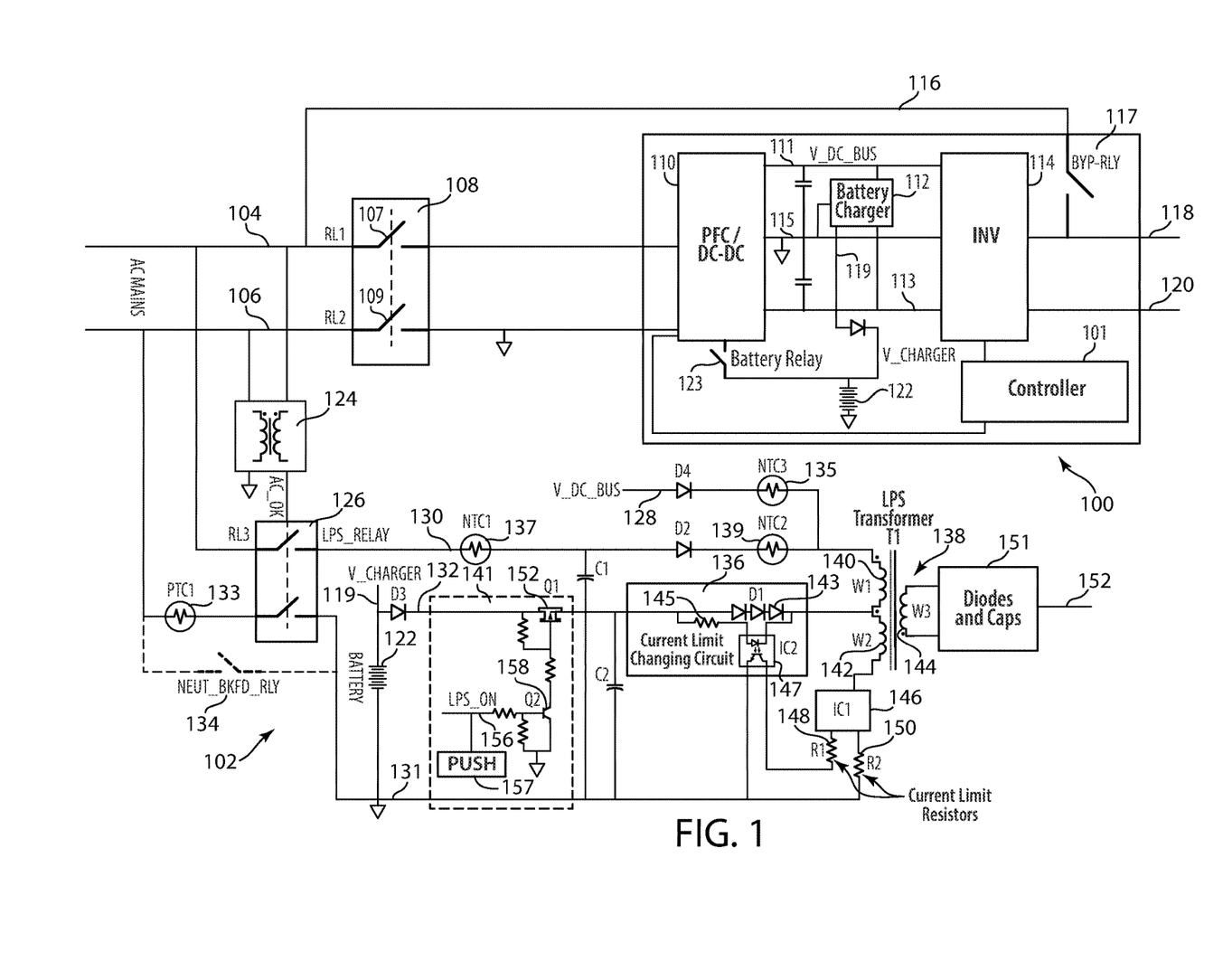
FIG. 1 illustrates a UPS and LPS system according to aspects of the current invention.

FIG. 1 illustrates a UPS 100 including an LPS system 102 according to at least one embodiment described herein. The UPS 100 includes a controller 101, an input line 104, an input neutral line 106, a backfeed relay circuit 108, a Power Factor Correction (PFC) converter 110, a battery charger 112, an inverter 114, a bypass line 116, an output line 118, a neutral output line 120, a battery 122, and the LPS system 102.

The LPS system 102 includes AC_OK control logic 124, an LPS relay 126, an LPS DC bus line 128, an LPS mains line 130, an LPS neutral line 131, an LPS battery/charger line 132, the battery 122, a neutral backfeed relay 134, a current limit changing circuit 136, a transformer 138, an LPS ON/OFF switching logic module 141, an LPS controller 146, current limit resistors 148, 150, a diode and capacitor circuit 151, and an output 152. The transformer 138 includes a first primary winding 140, a second primary winding 142, and at least one secondary winding 144. According to one embodiment, the transformer 138 is a flyback transformer in which the polarity of the primary windings 140, 142 is opposite that of the polarity of the secondary windings 144; however, in other embodiments, a different type of transformer may be utilized. According to one embodiment, the LPS ON/OFF switching logic module 141 includes a Field Effect Transistor (FET) 152, an LPS_on line 156, a manual switch 157, and a transistor 158. According to one embodiment, the current limit changing circuit 136 includes a diode 143, a resistor 145, and an optocoupler 147.

The input line 104 and the neutral line 106 of the UPS 100 are coupled to an input of the PFC converter 110 via the backfeed relay 108. The backfeed relay 108 includes a positive relay 107 coupled between the input line 104 and the PFC converter 110 and a neutral relay 109 coupled between the neutral input line 106 and the PFC converter 110. The inverter 114 is coupled to an output of the PFC converter 110 via a positive DC bus 111 and a negative DC bus 113. The output line 118 and the neutral output line 120 are coupled to an output of the inverter 114. The bypass line 116 is coupled between the input line 104 of the UPS 100 and the output line 118 of the UPS 100 via a bypass relay 117.

The battery charger 112 is coupled between the positive DC bus 111 and the negative DC bus 113. The battery charger 126 is also coupled to a neutral bus 115 that is coupled between the input neutral line 106 and the neutral output line 120. An output 119 of the battery charger 112 is coupled to a positive side of the battery 122 via a diode. The positive side of the battery 122 is also coupled to the PFC converter 110 via a battery relay 123. The negative side of the battery 122 is coupled to ground. The controller 101 is coupled to the PFC converter 110 and the inverter 114.

The AC_OK control logic 124 is coupled to the input line 104 and the input neutral line 106. The AC_OK control logic 124 is also coupled to the LPS relay 126 and is configured to provide an AC_OK signal to the LPS relay 126 to control the operational state of the LPS relay 126. The AC_OK control logic 124 will be discussed in greater detail below. The input line 104 is coupled to the LPS mains line 130 of the LPS system 102 via the LPS relay 126. The input neutral line 106 is coupled to the LPS neutral line 131 via the LPS relay 126 and a Positive Temperature Coefficient (PTC) thermistor 133. The input neutral line 106 is also coupled to the LPS neutral line 131 via a neutral backfeed relay 134. According to one embodiment, the neutral backfeed relay 134 is the same neutral relay 109 as in the backfeed relay 108 of the UPS 100.

The LPS DC bus line 128 of the LPS system 102 is coupled between the positive DC bus 111 of the UPS 100 and the first primary winding 140 of the transformer 138 via a diode and a Negative Temperature Coefficient (NTC) thermistor 135. The LPS mains line 130 of the LPS system 102 is coupled between the LPS relay 126 and the first primary winding 140 of the transformer 138 via a diode and multiple NTC thermistors 137, 139. As discussed above, the output 119 of the battery charger 112 is coupled to the positive side of the battery 122. The positive side of the battery 122 is also coupled to the second primary winding 142 of the transformer 138 via the LPS battery/charger line 132, a diode, the FET 152 of the LPS ON/OFF switching logic module 141, and the diode 143 of the current limit changing circuit 136.

The second primary winding 142 of the transformer 138 is also coupled to the LPS controller 146. A first current limit resistor 150 is coupled between the LPS controller 146 and the LPS neutral line 131. A second current limit resistor 148 is coupled between the LPS controller 146 and the optocoupler 147 of the current limit changing circuit 136. The optocoupler 147 is also coupled to the LPS neutral line 131. The resistor 145 and the optocoupler 147 of the current limit changing circuit 136 are coupled in series across the diode 143 of the current limit changing circuit 136. The secondary winding 144 of the transformer 138 is coupled to the output 152 via the diode and capacitor circuit 151.

Within the LPS ON/OFF switching logic module 141, the source of the FET 152 is coupled to the output 119 of the battery charger 112 and the positive side of the battery 122. The drain of the FET 204 is coupled to the current limit changing circuit 136. The gate of the FET 152 is coupled to the collector of the transistor 158. The emitter of the transistor 158 is coupled to ground. The base of the transistor 158 is coupled to the LPS_on line 156. The manual switch 157 is coupled to the LPS_on line 156.

The input line 104 and the neutral input line 106 of the UPS 100 are coupled to AC mains and receive AC power from AC mains. Based on the presence and quality of AC power received from the AC mains, the UPS 100 is configured to operate in different modes of operation.

In response to a determination that the AC power received from AC mains is at a desired level and/or quality level, the UPS 100 enters a "bypass" mode of operation. In the "bypass" mode of operation, the backfeed relay 108 is opened, the bypass relay 117 is closed, and the input line 104 of the UPS 100 (coupled to AC mains) is coupled directly to the output line 118 of the UPS 100 via the bypass line 116.

In the "bypass" mode of operation, AC power received at the input line 104 from AC mains is provided directly to the output 118.

In response to a determination that the AC power received from AC mains is either lower than or greater than the desired level (e.g., is in a sag or swell condition), the UPS 100 enters an "on-line" mode of operation. In the "on-line" mode of operation, the backfeed relay 108 is closed, the bypass relay 117 is opened, and the PFC converter 110 receives AC power from AC mains. The PFC converter 110 converts the AC power into DC power, provides positive DC power to the positive DC bus 111, and provides negative DC power to the negative DC bus 113. DC power on the positive 111 and negative 113 busses is provided to the inverter 114. The inverter 114 converts the received DC power into desired AC power and the desired AC power is provided to the output line 118 of the UPS 100.

Also in the "on-line" mode of operation, DC power on the positive 111 and negative 113 DC busses is provided to the battery charger 112. The battery charger 112 converts the DC power received from the DC busses 111, 113 into DC power at a desired level. The DC power from the battery charger 112 is provided to the positive side of the battery 122 to charge the battery 122.

In response to a determination that the AC power received from AC mains has failed (e.g., is in a brownout or blackout condition), the UPS 100 enters a "battery" mode of operation. In the "battery" mode of operation, the backfeed relay 108 is opened and the battery relay 123 is closed. DC power from the battery 122 is provided to the PFC 110 via the battery relay 123 as the battery 122 discharges. The PFC converter 110 converts the DC power received from the battery 122 into DC power at a desired level and provides the desired DC power to the positive 111 and negative 113 DC buses. DC power on the positive 111 and negative 113 busses is provided to the inverter 114. The inverter 114 converts the received DC power into desired AC power, and the desired AC power is provided to the output line 118 of the UPS 100.

The LPS system 102 is configured to receive power from multiple power sources within the UPS 100. According to one embodiment, the LPS system 102 is configured to receive power from either AC mains (e.g., via the LPS mains line 130 coupled to the input line 104), a first DC source (e.g., via the LPS battery/charger line 132 coupled to the DC battery 122/battery charger 112), or a second DC source (e.g., via the LPS DC bus line 128 coupled to the positive DC bus 111 of the UPS 100), depending on the status or operational state of the UPS 100. Operation of the LPS system 102 is discussed in greater detail below with regard to FIG. 2.

Figure 2:
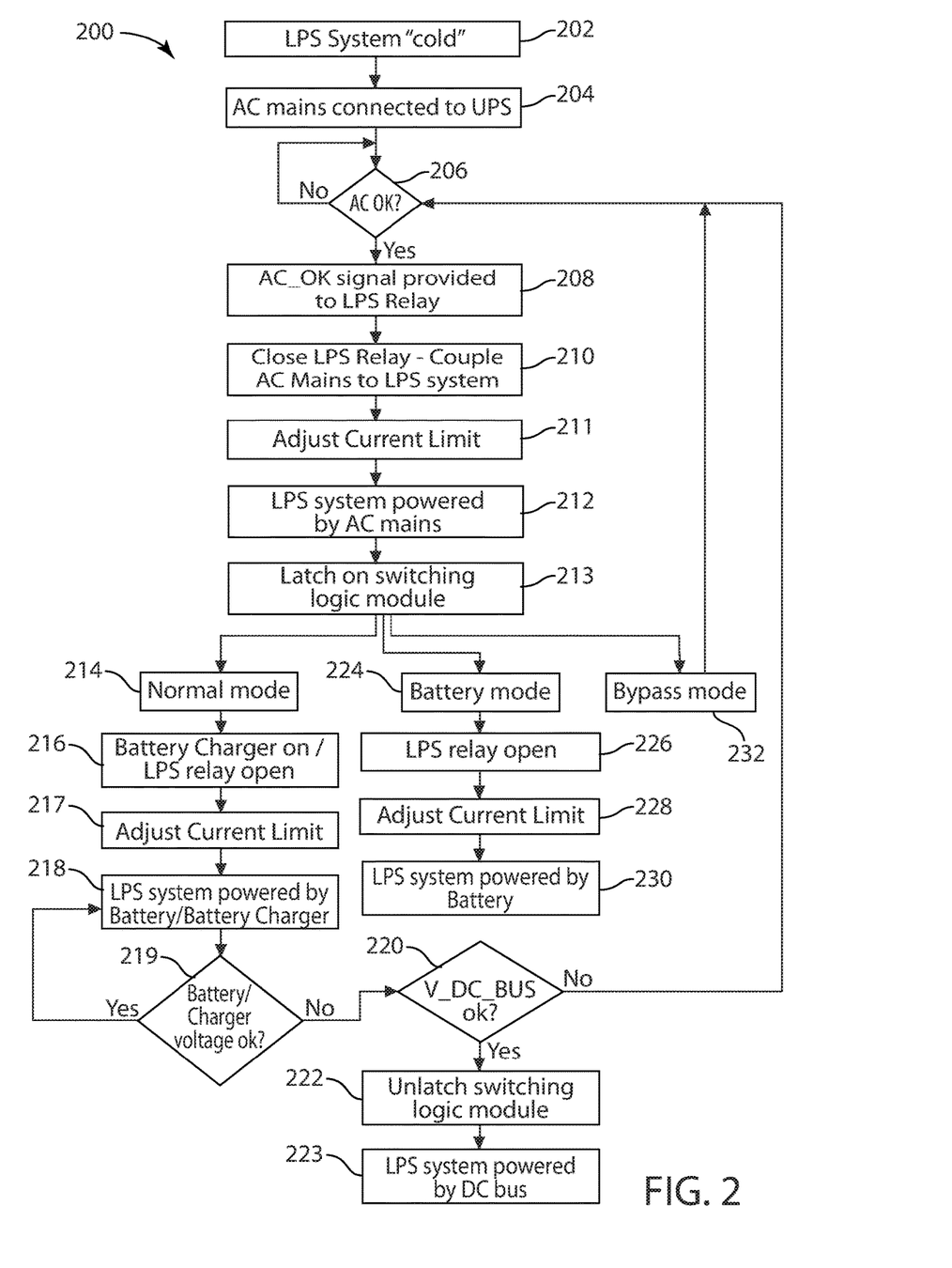
FIG. 2 is a flow chart illustrating an AC wakeup process for operating an LPS system according to aspects of the current invention.

FIG. 2 is a flowchart 200 illustrating an "AC wakeup" process for operating the LPS system 102 according to at least one embodiment. At block 202, the LPS system 102 is "cold" (i.e., unpowered). At block 204, a user of the UPS 100 connects AC mains to the input lines 104, 106 of the UPS 100. For example, according to one embodiment, the user of the UPS 100 connects AC mains to the UPS 100 with a cable.

At block 206, the AC_OK control logic 124 monitors the input AC power received at the input lines 104, 106 from AC mains and determines if the input AC power is valid (i.e., above an input power threshold). If the AC_OK control logic 124 determines that the input AC power is not valid (i.e., below the input power threshold), at block 204, the AC_OK control logic 124 continues to monitor the input AC power received at the input line 104, 106 from AC mains.

At block 208, in response to a determination that the input AC power is valid, the AC_OK control logic 124 provides an AC_OK signal to the LPS relay 126 indicating that the input AC power is valid. Operation of the AC_OK control logic 124 is discussed in greater detail below.

At block 210, in response to receiving the AC_OK signal, the LPS relay 126 is closed and the input line 104 of the UPS 100 (coupled to AC mains) is coupled to the LPS system 102 via the LPS relay 126 and the LPS mains line 130. Once the LPS relay 126 is closed, the input neutral line 106 is also coupled to the LPS neutral line 131 via the PTC thermistor 133 and the LPS Relay 126.

At block 211, the LPS controller 146 operates the current limit changing circuit 136 to adjust the current limit of the transformer 138 based on which source is providing power to the LPS system 102. The LPS controller 146 selectively couples the primary windings 140, 142 of the transformer to either the first current limit resistor 150 or the parallel combination of the first and second current limit resistors 148, 150 based on which source is providing power to the LPS system 102. For example, in one embodiment, where AC mains is providing power to the LPS system 102, the LPS controller 146 selectively couples the primary windings 140, 142 of the transformer 138 to the LPS neutral line 131 via the first current limit resistor 150. The first current limit resistor 150 controls the current limit of the transformer 138 to a level appropriate for operation with input AC mains power.

At block 212, input AC power received by the LPS mains line 130 is provided to the first primary winding 140 of the transformer 138. The LPS controller 146 controls the current through the first primary windings 140 of the transformer 138. For example, according to one embodiment, the LPS controller 146 includes switches (e.g., FETs) coupled between the primary windings 140, 142 and the current limit resistors 148, 150. By turning the switches on or off, the LPS controller 146 selectively couples the primary windings 140, 142 of the transformer 138 to the current limit resistors 148, 150, and thereby controls the current through the primary windings 140, 142.

According to one embodiment, the LPS controller 146 is a flyback controller. For example, in one embodiment, the LPS controller 146 is a TOPSwitch based flyback controller manufactured by Power Integrations of San Jose, Calif.; however, in other embodiments, another type of flyback controller may be utilized. According to one embodiment, the LPS controller 146 includes flyback control circuitry as described in International Patent Application Number PCT/US13/23855 entitled "FLYBACK CONVERTER," filed on Jan. 30, 2013, which is herein incorporated by reference in its entirety. As described herein, the LPS controller 146 is a flyback controller; however, in other embodiments, a different type of controller may be utilized to control current through the primary windings 140, 142.

Once input AC power is provided to the first primary winding 140, the LPS controller 146 controls current through the primary windings 140, 142 to generate desired current in the secondary winding 144. For example, when the LPS controller 146 couples the primary windings 140, 142 to the current limit resistor 150 (e.g., by closing a switch or turning on a FET), current from the LPS mains line 130 passes through the primary windings 140, 142 and resulting energy is stored in the transformer 138. Due to the reverse polarity of the secondary winding 144, the current through the primary windings 140, 142 generates a negative voltage on the secondary winding 144. Due to the negative voltage on the secondary winding 144, diodes within the diode and capacitor circuit 151 are reverse-biased, preventing current in the secondary winding 144.

When the LPS controller 146 disconnects the primary windings 140, 142 from the current limit resistor 150 (e.g., by opening a switch or turning off a FET) current from the LPS mains line 130 through the primary windings 140, 142 to the current limit resistor 150 stops. The diodes within the diode and capacitor circuit 151 that were previously reverse-biased are forward-biased and energy previously stored in the transformer 138 is discharged through the secondary winding 144. The resulting current in the secondary winding 144 generates an LPS voltage (e.g., 12V, 24V, etc.) on the output line 153. The output line 153 is configured to be coupled to a subsystem within the UPS 100 (e.g., such as a DSP processor, controller 101, control and communication systems, gate driver, etc.) and to provide supply power to the subsystem.

At block 213, the LPS voltage of the LPS system 102 on the output lines 152 is provided to the LPS ON/OFF switching logic module 141 via the LPS_on line 156. The LPS voltage on the LPS_on line 156 latches on the transistor 158 and, as a result, also latches on the FET 152. Once the FET 152 is turned on, available power from the battery charger 112 and/or battery 122 is provided to the second primary winding 142 via the FET 152. Voltage from the battery 122/and or battery charger 112 on the LPS battery/battery charger line 132 is also provided directly to the gate of the FET 152 to maintain the FET 152 in an "on" or latched state.

Once the LPS voltage on the output line 153 is generated from input AC mains power, the UPS controller 101 (powered by the LPS voltage) monitors the input AC power of the UPS 100 and operates the UPS 100 in one of a "normal", "bypass", or "battery" mode of operation based on the status of the input AC power, as discussed above.

At block 214, in response to a determination that the AC power received from AC mains is either lower than or greater than the desired level (e.g., is in a sag or swell condition), the UPS controller 101 operates the UPS 100 in the "on-line" mode of operation. In the "on-line" mode of operation of the UPS 100, the backfeed relay 108 is closed and the PFC converter 110, inverter 114, and battery charger 112 are turned on (as discussed above).

At block 216, once the battery charger 112 is turned on, the UPS controller 101 transmits an LPS_LINE_INPUT_OFF signal to the AC_OK control logic 124 to control the AC_OK control logic 124 to open the LPS relay 126. Despite the LPS relay 126 being opened, the LPS inverter line 131 maintains its connection with the input neutral line 106 via the closed neutral backfeed relay 134 (e.g., the closed neutral relay 109 in the "on-line" mode of operation of the UPS 100).

At block 217, the LPS controller 146 operates the current limit changing circuit 136 to adjust the current limit of the transformer 138 based on which source is providing power to the LPS system 102. As discussed above, the LPS controller 146 selectively couples the primary windings 140, 142 of the transformer to either the first current limit resistor 150 or the parallel combination of the first and second current limit resistors 148, 150 based on which source is providing power to the LPS system 102. For example, according to one embodiment, where the battery 122 and/or battery charger 112 is providing power to the LPS system 102, current from the battery 122/battery charger 112 flows through the FET 152 and the diode 143 of the current limit changing circuit 136. This turns on the optocoupler 147 of the current limit changing circuit 136, thereby connecting the second current limit resistor 148 to the LPS controller 146, in parallel with the first current limit resistor 150, and adjusting the current limit of the transformer 138 to a level suitable for low voltage input provided by the battery 122/battery charger 112 to the LPS system 102.

At block 218, once the LPS relay 126 is open, power from the battery 122 and/or battery charger 112 is provided to the second primary winding 142 of the transformer 138 via the FET 152 (which is latched on) and the current limit changing circuit 136.

Once input DC power is provided to the second primary winding 142, the LPS controller 146 controls current through the second primary winding 142 to generate desired current in the secondary winding 144. For example, when the LPS controller 146 couples the second primary winding 142 to the current limit resistors 148, 150 (e.g., by closing a switch or turning on a FET as discussed above), current from the battery 122 and/or the battery charger 112 passes through the second primary winding 142 and resulting energy is stored in the transformer 138. Due to the reverse polarity of the secondary winding 144, the current through the second primary winding 142 generates a negative voltage on the secondary winding 138. Due to the negative voltage on the secondary winding 144, diodes within the diode and capacitor circuit 151 are reverse-biased, preventing current in the secondary winding 144.

When the LPS controller 146 disconnects the second primary winding 142 from the current limit resistors 148, 150 (e.g., by opening a switch or turning off a FET) current from the battery 122 and/or battery charger 119 through the second primary winding 142 to the current limit resistors 148, 150 stops. The diodes within the diode and capacitor circuit 151 that were previously reverse-biased are forward-biased and energy previously stored in the transformer 138 is discharged through the secondary winding 144. The resulting current in the secondary winding 144 generates the LPS voltage (e.g., 12V, 24V, etc.) on the output line 153 to be provided to subsystems within the UPS 100.

At block 219, the UPS controller 101 determines if the voltage provided by the battery 122 and/or battery charger 112 is at an acceptable level (e.g., above a DC power threshold level). In response to a determination that the voltage provided by the battery 122 and/or battery charger 112 is at an acceptable level, at block 218 the LPS system 102 continues to be powered by the battery 122/battery charger 112.

At block 220, in response to a determination that the voltage provided by the battery 122 and/or battery charger 112 is not at an acceptable level (e.g., below the DC power threshold level), the UPS controller 101 determines if the voltage (V_DC_BUS) on the positive DC bus 111 is at an acceptable level (e.g., above a DC bus threshold level) to power the LPS system 102. At block 222, in response to a determination that the voltage on the positive DC bus 111 is at an acceptable level, the UPS controller 101 turns the FET 152 off, decoupling the battery 122/battery charger 112 from the second primary winding 142.

At block 223, DC power from the positive DC bus 111 of the UPS 100 is provided to the first primary winding 140 of the transformer 138 via the DC bus line 128 and the NTC thermistor 135.

Once DC power is provided to the first primary winding 140 from the positive DC bus 111, the LPS controller 146 controls current through the primary windings 140, 142 to generate desired current in the secondary winding 144, as discussed above. The resulting current in the secondary winding 144 generates the LPS voltage (e.g., 12V, 24V, etc.) on the output line 153 to be provided to subsystems within the UPS 100.

In response to a determination that the voltage on the positive DC bus 111 is not at an acceptable level (e.g., below the DC bus threshold level), at block 206 the AC_OK control logic 124 again monitors the input AC power received at the input lines 104, 106 from AC mains to determine if power from AC mains is at a level sufficient to power the LPS system 102.

As described above, upon determining that voltage provided by the battery 122/battery charger 112 is insufficient to power the LPS system 102, the UPS controller 101 first attempts to power the LPS system 102 from the positive DC bus 111 before transitioning back to AC mains power. However, according to another embodiment, upon determining that voltage provided by the battery 122/battery charger 112 is insufficient, the UPS 101 may attempt to transition back to AC mains power directly (e.g., at block 206) without first attempting to power the LPS system 102 with power from the positive DC bus 111 (e.g., at blocks 220-223).

At block 224, in response to a determination that the AC power received from AC mains has failed (e.g., is in a brownout or blackout condition), the UPS controller 101 operates the UPS 100 in the "battery" mode of operation. In the "battery" mode of operation of the UPS 100, the backfeed relay 108 is opened, the battery relay 123 is closed, and DC power from the battery 122 is provided to the PFC 110 via the battery relay 123 as the battery 122 discharges (As discussed above).

At block 226, once the UPS 1010 enters the "battery" mode of operation, the UPS controller 101 transmits an LPS_LINE_INPUT_OFF signal to the AC_OK control logic 124 to open the LPS relay 126. At block 228, the current limit changing circuit 136 operates to adjust the current limit of the transformer 138 by selectively coupling the primary windings 140, 142 of the transformer 138 to the second current limit resistor 148, as discussed above. The parallel combination of the first and second current limit resistors 148, 150 operates with the optocoupler 147, resistor 145, and diode 143 of the current limit changing circuit 136 to adjust the current limit of the transformer 138 to a level appropriate for operation with the battery 122.

At block 230, once the LPS relay 126 is open, power from the battery 122 is provided to the second primary winding 142 of the transformer 138 via the FET 152 (which is latched on) and the current limit changing circuit 136. Once DC power is provided to the second primary winding 142 from the battery 122, the LPS controller 146 controls current through the second primary winding 142 to generate desired current in the secondary winding 144, as discussed above. The resulting current in the secondary winding 144 generates the LPS voltage (e.g., 12V, 24V, etc.) on the output line 153 to be provided to subsystems within the UPS 100.

At block 232, in response to a determination that the AC power received from AC mains is at a desired level, the UPS 100 enters a "bypass" mode of operation. In the "bypass" mode of operation, the backfeed relay 108 is opened, the bypass relay 117 is closed, and the input line 104 of the UPS 100 (coupled to AC mains) is coupled directly to the output line 118 of the UPS 100 via the bypass line 116. Upon entering the "bypass" mode of operation, at block 206, the AC_OK control logic 124 continues to monitor the input AC power received at the input lines 104, 106 from AC mains to determine if power from AC mains is at a level sufficient to power the LPS system 102, as discussed above.

Figure 3:
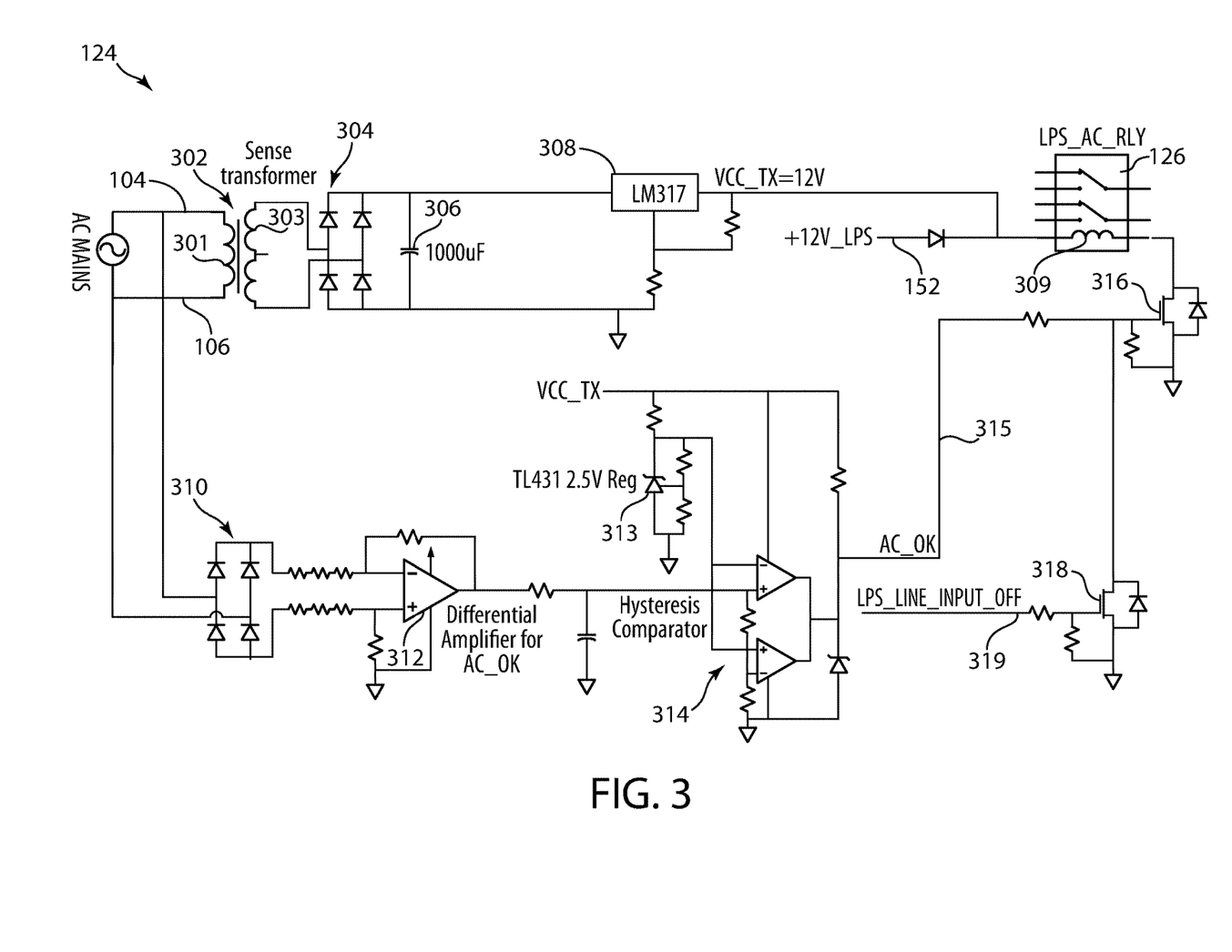
FIG. 3 is a circuit diagram of AC_OK control logic used in aspects of the current invention.

FIG. 3 illustrates a circuit diagram of the AC_OK control logic 124. The AC_OK control logic 124 includes a sense transformer 302, a first rectifier 304, a capacitor 306, a voltage regulator 308, a second rectifier 310, a differential amplifier 312, a comparator 314, a voltage reference 313, a first switch 316, and a second switch 318. According to one embodiment, the first and second switches 316, 318 are FETs; however, in other embodiments, different types of switched may be utilized. In one embodiment, the comparator 314 is a hysteresis comparator; however, in other embodiments, a different type of comparator 314 may be used.

The primary winding 301 of the sense transformer 302 is coupled between the input lines 104, 106 of the UPS 100. The secondary winding 303 of the sense transformer 302 is coupled to an input of the first rectifier 304. The output of the first rectifier 304 is coupled to an input of the voltage regulator 308. The output of the voltage regulator is coupled to the first switch 316 via a coil 309 of the LPS relay 126. The output 152 of the LPS system 102 is also coupled to the first switch 316 via the coil 309 of the LPS relay 126.

An input of the second rectifier 310 is coupled to the input lines 104, 106, of the UPS 101. An output of the second rectifier 310 is coupled to input terminals of the differential amplifier 312. The output of the differential amplifier 312 is coupled to input terminals of the comparator 314. Input terminals of the comparator 314 are also coupled to the voltage reference 313. An output of the comparator is coupled to the output of the voltage regulator 308 and a gate of the first switch 316. The gate of the first switch 316 is also coupled to the second switch 318. The gate of the second switch 318 is coupled to the UPS controller 101.

As input AC power is provided to the input lines 104, 106, of the UPS 100 from AC mains, input AC power from AC mains is also provided to the primary winding 301 of the sense transformer 302. AC Current in the primary winding 301 generates AC current in the secondary winding 303 of the sense transformer 302. AC current from the secondary winding 303 is rectified by the first rectifier 304 and resulting DC power is provided to the input of the voltage regulator 308. The voltage regulator 308 outputs a relatively stable supply voltage (e.g., 12V DC) to the LPS relay 126. The supply voltage from the voltage regulator 308 is also provided to the differential amplifier 312, the voltage reference 313, and the comparator 314. According to one embodiment, the voltage regulator is an LM317 3-Terminal Positive Adjustable Regulator manufactured by Texas Instruments of Dallas, Tex.; however, in other embodiments, any type of voltage regulator may be utilized.

Input AC power at the input lines 104, 106 of the UPS 100 is also provided to the second rectifier 310. The second rectifier 310 rectifies the input AC power and provides resulting DC power to the input terminals of the differential amplifier 312. The differential amplifier 312 receives the rectified DC power from the second rectifier 310 and provides an input reference signal (related to the input AC power provided to the input lines 104, 106) to the comparator 314. The differential amplifier 312 ensures that the input reference signal provided to the comparator 314 is unaffected by LPS relay 126 turning on and off.

The voltage reference 313 receives the supply voltage from the voltage regulator 308, generates a threshold reference voltage, and provides the threshold reference voltage to the comparator 314. According to one embodiment, the voltage reference 313 is a TL431 adjustable precision shunt regulator manufactured by Texas Instruments of Dallas, Tex.; however, in other embodiments, a different type of voltage reference may be utilized.

The comparator 314 receives the input reference signal from the differential amplifier 312 and the threshold reference voltage from the voltage reference 313 and compares the input reference signal (related to the input AC power provided to the input lines 104, 106) to the threshold reference voltage. If the input reference signal is not at least at the level of the threshold reference voltage (indicating that the input AC mains voltage is not at a level sufficient to power the LPS system 102), the comparator 314 outputs a low AC_OK signal 315. The low AC_OK signal is provided to the gate of the first switch 316 and the first switch 316 (coupled between the coil 309 and ground) remains open, preventing current through the coil 309 of the LPS relay 126.

If the input reference signal is at least at the level of the threshold reference voltage (indicating that the input AC mains voltage is at a level sufficient to power the LPS system 102), the comparator 314 outputs a high AC_OK signal 315. The high AC_OK signal is provided to the gate of the first switch 316. The high AC_OK signal turns on the first switch 316, coupling the coil 309 of the LPS relay 126 to ground and allowing current through the coil 309 from the voltage regulator 308 to ground.

Current in the coil 309 of the LPS relay 126 from the voltage regulator 308 generates a magnetic field that forces the LPS relay 126 to close, coupling the input lines 104, 106 of the UPS 100 to the LPS system 102. AC power from the input lines 104, 106 powers the LPS system 102 and the LPS system 102 generates the LPS voltage on the output line 153 of the LPS system 102 as also discussed above.

Once the LPS system 102 (powered by input AC mains power) generates the LPS voltage on the output line 153, the LPS voltage (e.g., 12V DC) on the output line 153 is also provided to the coil of the LPS relay 126. Assuming that the AC_OK signal is still high (due to input AC mains power being at a sufficient level to power the LPS system 102), current passes from the output line 153 to ground via the coil 309 of the LPS relay 126 and the first switch 316. Current in the coil 309 of the LPS relay 126 from the output line 153 generates a magnetic field that maintains the LPS relay 126 in a closed position and the input lines 104, 106 of the UPS 100 remain coupled to the LPS system 102. AC power from the input lines 104, 106 continues to power the LPS system 102 and the LPS system 102 generates the LPS voltage on the output line 153 of the LPS system 102 as discussed above.

If, as discussed above, the LPS system 102 transitions from input AC mains power to battery 122/battery charger 112 power, the UPS controller 101 transmits an LPS_LINE_INPUT_OFF signal 319 to the AC_OK control logic 124. The LPS_LINE_INPUT_OFF signal 319 is provided to the gate of the second switch 318 and drives the second switch closed, coupling the gate of the first switch 316 to ground. Once the gate of the first switch 316 is coupled to ground, the first switch 316 is driven open, decoupling the coil 309 from ground and preventing current through the coil 309. The LPS relay 126 is opened and the input lines 104, 106 of the UPS 100 are decoupled from the LPS system 102. Once AC mains is decoupled from the LPS system 102, DC power from the battery 122/battery charger 122 or DC bus 111 may power the LPS system 102, as discussed above.

Figure 4:
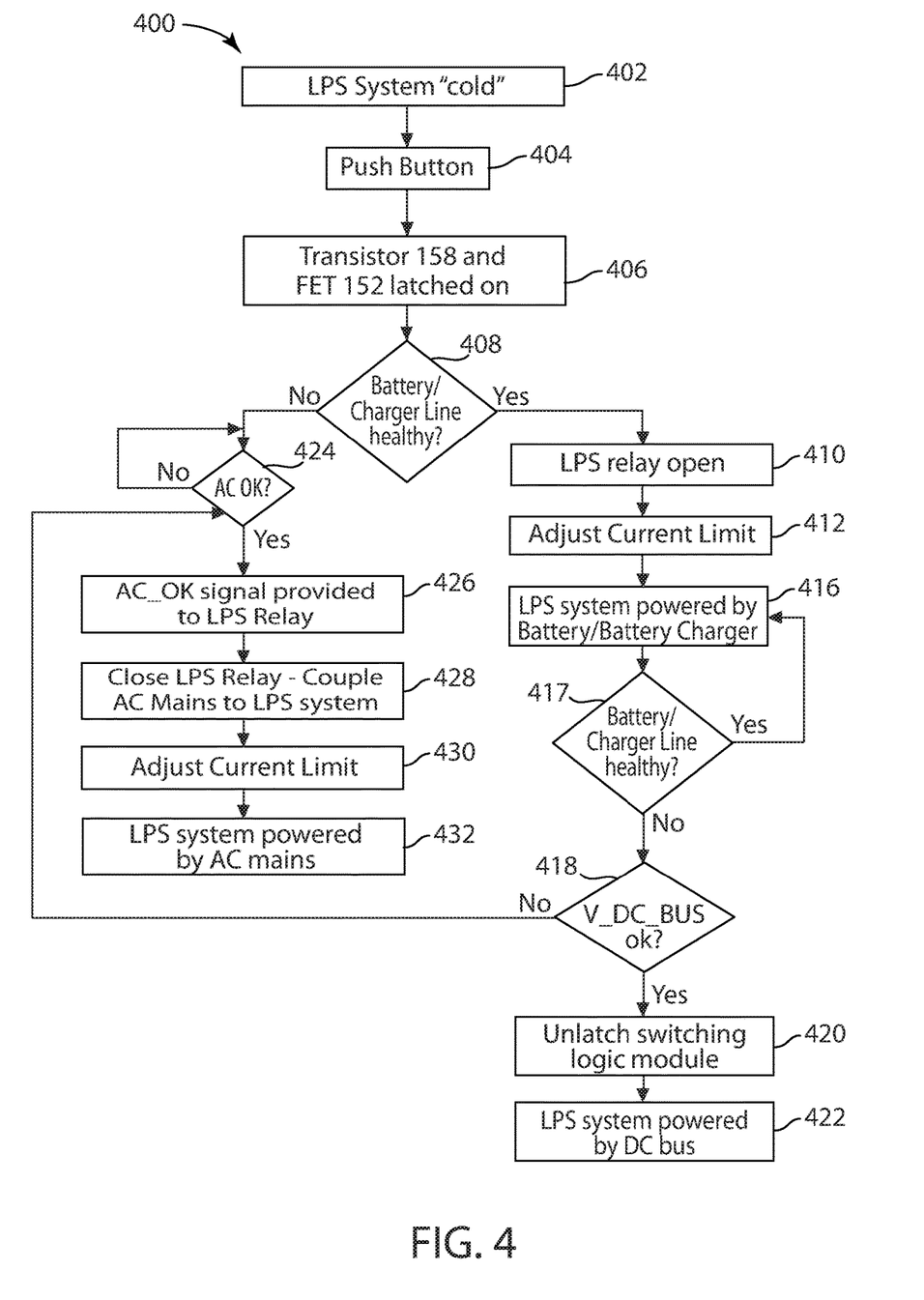
FIG. 4 is a flow chart illustrating a cold boot process for operating an LPS system according to aspects of the current invention.

Operation of the LPS system 102 is discussed in greater detail below with regards to FIG. 4. FIG. 4 is a flow chart 400 illustrating a "cold boot" process for operation of the LPS system 102. At block 402, the LPS system 102 is "cold" (i.e., unpowered). According to one embodiment, a user may boot up the LPS system 102 by activating the manual switch 157. In one embodiment, the manual switch 157 is a push button. For example, at block 404, a user of the UPS 100 presses the bush button 157 coupled to the LPS_on line 156 of the LPS ON/OFF switching logic module 141.

At block 406, in response to the push button 157 being pressed, the LPS ON/OFF switching logic module 141 latches on the transistor 158 and, as a result, also latches on the FET 152. Once the FET 152 is turned on, available power from the battery charger 112 and/or battery 122 may be provided to the second primary winding 142 of the transformer 138 via the LPS battery/charger line 132, the FET 152 and the current limit changing circuit 136. Voltage on the LPS battery/charger line 132, generated by the battery charger 112 and/or battery 122, is provided to the gate of the FET 152 to maintain the FET 152 in an "on" or latched state.

At block 408, the UPS controller 101 determines if the voltage on the LPS battery/charger line 132, generated by the battery charger 112/battery 122, is healthy (i.e., greater than or equal to a threshold level). According to one embodiment, the UPS controller 101 utilizes a voltage comparator to compare the voltage on the LPS battery/charger line 232 with a DC power threshold level. The UPS controller 101 determines that the voltage on the LPS battery/charger line 232 is healthy if the voltage on the LPS battery/charger line 232 is at least at the level of DC power threshold level.

At block 410, in response to a determination that the voltage on the LPS battery/charger line 132 is healthy, the UPS controller 101 transmits an LPS_LINE_INPUT_OFF signal to the AC_OK control logic 124 to maintain the LPS relay 126 in an open position. At block 412, the LPS controller 146 operates the current limit changing circuit 136 to adjust the current limit of the transformer 138 by selectively coupling the primary windings 140, 142 of the transformer 138 to the second current limit resistor 148, as discussed above. The parallel combination of the first and second current limit resistors 148, 150 operates with the optocoupler 147, resistor 145, and diode 143 of the current limit changing circuit 136 to adjust the current limit of the transformer 138 to a level appropriate for operation with the battery 122.

At block 416, power from the battery 122/battery charger 112 is provided to the second primary winding 142 of the transformer 138 via the FET 152 (which is latched on) and the current limit changing circuit 136. Once DC power is provided to the second primary winding 142 from the battery 122, the LPS controller 146 controls current through the second primary winding 142 to generate desired current in the secondary winding 144, as discussed above. The resulting current in the secondary winding 144 generates the LPS voltage (e.g., 12V, 24V, etc.) on the output line 153 to be provided to subsystems within the UPS 100.

At block 417, the UPS controller 101 determines if the voltage on the LPS battery/charger line 232, generated by the battery charger 112 and/or battery 122, is still healthy. In response to a determination that the voltage on the LPS battery/charger line 132 is still healthy (i.e., the voltage on the LPS battery/charger line 132 is at least at the level of a reference voltage), at block 416 the LPS system 102 continues to run on power provided by the battery charger 112/battery 122.

In response to a determination that the voltage on the LPS battery/charger line 132 is no longer healthy (i.e., the voltage on the LPS battery/charger line 132 is no longer at the level of DC power threshold level due to a failed or removed battery 122 and/or battery charger 112), at block 418 the UPS controller 101 determines if voltage (V_DC_BUS) on the positive DC bus 111 is at an acceptable level (e.g., above a DC bus threshold level) to power the LPS system 102. At block 420, in response to a determination that the voltage on the positive DC bus 111 is at an acceptable level, the UPS controller 101 turns off the FET 152 off, decoupling the battery 122/battery charger 112 from the second primary winding 142. At block 422, DC power from the positive DC bus 111 of the UPS 100 is provided to the first primary winding 140 of the transformer 138 via the DC bus line 128 and the NTC thermistor 135.

Once DC power is provided to the first primary winding 140 from the positive DC bus 111, the LPS controller 146 controls current through the primary windings 140, 142 to generate desired current in the secondary winding 144, as discussed above. The resulting current in the secondary winding 144 generates the LPS voltage (e.g., 12V, 24V, etc.) on the output line 153 to be provided to subsystems within the UPS 100.

In response to a determination that the voltage on the positive DC bus 111 is not at an acceptable level (e.g., below the DC bus threshold level) or in response to a determination that the voltage on the LPS battery/charger line 132 is not healthy (e.g., below the DC power threshold level), at block 424 the AC_OK control logic 124 monitors the input AC power received at the input lines 104, 106 from AC mains to determine if power from AC mains is at a level sufficient to power the LPS system 102, as discussed above. If the AC_OK control logic 124 determines that the input AC power is not sufficient to power the LPS system 102, the AC_OK control logic 124 continues to monitor the input AC power received at the input line 104, 106 from AC mains.

At block 426, in response to a determination that the input AC power is valid (i.e., above an input power threshold level sufficient to power the LPS system 102), the AC_OK control logic 124 provides an AC_OK signal to the LPS relay 126 indicating that the input AC power is valid.

At block 428, in response to receiving the AC_OK signal, the LPS relay 126 is closed and the input line 104 of the UPS 100 (coupled to AC mains) is coupled to the LPS system 102 via the LPS relay 126 and the LPS mains line 130. Once the LPS relay 126 is closed, the input neutral line 106 is also coupled to the LPS neutral line 131 via the PTC thermistor 133 and the LPS Relay 126.

At block 430, the LPS controller 146 operates the current limit changing circuit 136 to adjust the current limit of the transformer 138 by selectively coupling the primary windings 140, 142 of the transformer to the LPS neutral line 131 via the first current limit resistor 150, as discussed above. The first current limit resistor 150 controls the current limit of the transformer 138 to a level appropriate for operation with input AC mains power.

At block 432, input AC power received by the LPS mains line 130 is provided to the first primary winding 140 of the transformer 138. Once AC power is provided to the first primary winding 140, the LPS controller 146 controls current through the primary windings 140, 142 to generate desired current in the secondary winding 144, as discussed above. The resulting current in the secondary winding 144 generates the LPS voltage (e.g., 12V, 24V, etc.) on the output line 153 to be provided to subsystems within the UPS 100.

As described above, upon determining that voltage provided by the battery 122/battery charger 112 is insufficient to power the LPS system 102, the UPS controller 101 first attempts to power the LPS system 102 from power provided by the positive DC bus 111 before transitioning to AC mains power. However, according to another embodiment, upon determining that voltage provided by the battery 122/battery charger 112 is insufficient, the UPS 101 may attempt to transition directly to AC mains power (e.g., at block 424) without first attempting to power the LPS system 102 with power from the positive DC bus 111 (e.g., at blocks 418-422).

As described above, the first primary winding 140 of the transformer 138 of the LPS system 102 is configured to receive power from AC mains via the LPS mains line 130 and the second primary winding 142 of the transformer 138 of the LPS system 102 is configured to receive power from the battery 122/battery charger 112 via the LPS battery/charger line 132. However, according to another embodiment where the voltage provided by AC mains and the battery 122/battery charger 112 to the transformer 138 is substantially the same, AC mains and the battery 122/battery charger 112 are both configured to provide power to the same primary winding of the transformer of the LPS system via the same single line. In such an embodiment, the current limit changing circuit 136 illustrated in FIG. 1 may be removed and the LPS mains line 130 and LPS battery/charger line 132 may be replaced by a single line coupled to the input lines 104, 106, the battery 122, the battery charger 112, and a single primary winding of the transformer 138.

As described above, the LPS system 102 utilizes a flyback converter (e.g., including LPS controller 146, a flyback transformer 138 and the diode and capacitor circuit 151) to generate desired voltage outputs from AC mains and the battery charger 112/battery 122; however, in other embodiments, other types of converters may be utilized to generate the desired voltage outputs from AC mains and the battery charger 112/battery 122.

Also, as described above, the LPS system 102 provides required bias power to different subsystems (e.g., a Digital Signal Processor (DSP), microcontroller, control and communication systems, gate driver, etc) of an Uninterruptible Power Supply (UPS); however, in other embodiments, the LPS system 102 may be utilized in other systems in which bias or supply power is required.

Accordingly, embodiments described herein provide a single-transformer based LPS system and control scheme that is more efficient, smaller, and less costly than traditional LPS systems. The LPS architecture can be powered from line as well as battery, with the presence of a backfeed relay, and with wide ranging battery and mains voltages (e.g., 48V battery and 230V mains). In addition, the LPS architecture may also provide protection against line neutral reversal in the case of UPS's coupled in parallel.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) system, the UPS system comprising:
   an input configured to be coupled to an AC power source;
   a transformer including:
      at least one primary winding configured to be coupled to a DC power source; and
      at least one secondary winding;
   a relay configured to selectively couple the input to the at least one primary winding;
   a sense circuit coupled to the input and the relay;

a current control circuit coupled to the at least one primary winding; and at least one output line coupled to the at least one secondary winding, wherein the sense circuit is configured to monitor a level of input AC power at the input, determine whether the level of input AC power is above an input power threshold level, control the relay to couple, in a first mode of operation of the UPS, the input to the at least one primary winding in response to a determination that the input AC power is above the input power threshold level, and control the relay to decouple, in a second mode of operation of the UPS, the input from the at least one primary winding in response to a determination that the input AC power is below the input power threshold level, and wherein the current control circuit is configured, in the first mode of operation of the UPS, to control current from the AC power source through the at least one primary winding to generate an output voltage at the at least one output line and, in the second mode of operation of the UPS, to control current from the DC power source through the at least one primary winding to generate the output voltage at the at least one output line.

2. The UPS system of claim 1, wherein the at least one primary winding of the transformer includes:

a first primary winding selectively coupled to the input via the relay; and a second primary winding configured to be coupled to the DC source via a DC line.

3. The UPS system of claim 2, wherein the relay is configured to selectively couple the input to the first primary winding, wherein the sense circuit is configured, in the first mode of operation of the UPS, to control the relay to couple the input to the first primary winding, and wherein the current control circuit is configured, in the first mode of operation of the UPS, to control current from the AC power source through the first primary winding to generate the output voltage at the at least one output line.

4. The UPS system of claim 2, wherein the sense circuit is configured, in the second mode of operation of the UPS, to control the relay to decouple the input from the first primary winding, and wherein the current control circuit is configured, in the second mode of operation of the UPS, to control current from the DC power source through the second primary winding to generate the output voltage at the at least one output line.

5. The UPS system of claim 2, further comprising a current limit changing circuit configured to be coupled between the DC power source and the transformer, wherein the current control circuit is further configured to operate the current limit changing circuit to adjust a current limit of the transformer in the second mode of operation of the UPS.

6. The UPS system of claim 2, further comprising:
a controller coupled to the DC line;
a converter coupled to the input;
an inverter coupled to the converter via a DC bus; and
a battery charger coupled to the DC bus and the DC line,
wherein the DC power source is a battery coupled to the DC line,
wherein the battery charger is configured to provide DC power from the DC bus to the battery and DC line, and
wherein the controller is configured to monitor a voltage level of the DC line and, in response to determining that the voltage level of the DC line is above a DC line voltage threshold, to operate the sense circuit to drive the UPS into the second mode of operation.

7. The UPS system of claim 6, further comprising:
a DC bus line coupled between the DC bus and the first primary winding; and
a switch configured to selectively couple the battery and battery charger to the second primary winding,
wherein, in a third mode of operation of the UPS, the controller is further configured, in response to determining that the voltage level of the DC line is below the DC line voltage threshold, to operate the switch to decouple the battery and battery charger from the second primary winding, and
wherein, in the third mode of operation of the UPS, the current control circuit is further configured to control current from the DC bus line through the first primary winding to generate the output voltage at the at least one output line.

8. The UPS system of claim 6, further comprising:
a neutral line selectively coupled to the input via the relay and selectively coupled to the input via a neutral backfeed relay,
wherein in the second mode of operation of the UPS, the sense circuit is configured to control the relay to decouple the input from the neutral line, and
wherein in the second mode of operation of the UPS, the controller is configured to control the neutral backfeed relay to couple the input to the neutral line.

9. The UPS system of claim 6, further comprising a manual switch coupled to the switch, wherein the manual switch is configured to operate the switch to couple the battery and battery charger to the second primary winding in response to a user activating the manual switch.

10. The UPS system of claim 1, wherein the transformer is a flyback transformer.

11. The UPS system of claim 1, wherein the sense circuit comprises a sense transformer coupled to the input and configured to receive the input AC power and generate an AC input power sense signal related to the input AC power.

12. The UPS system of claim 11, wherein the sense circuit further comprises:
a first rectifier coupled to the sense transformer and configured to rectify the AC input power sense signal into a rectified signal; and
a voltage regulator coupled to the first rectifier and the relay and configured to generate a supply voltage based on the rectified signal and provide the supply voltage to the relay.

13. The UPS system of claim 12, wherein the sense circuit further comprises:
a second rectifier coupled to the input and configured to rectify the input AC power into a rectified input power sense signal;
an amplifier coupled to the second rectifier and configured to generate an input reference signal based on the rectified input power sense signal; and
a comparator coupled to the amplifier and configured to compare the input reference signal to the input power threshold level and provide a relay control signal to the relay to operate the relay to couple the input to the at least one primary winding in response to a determination that the input reference signal is above the input power threshold level.

14. The UPS system of claim 13, wherein the comparator is further configured to provide the relay control signal to the relay to operate the relay to decouple the input from the at least one primary winding in response to a determination that the input reference signal is below the input power threshold level.

15. The UPS system of claim 12, wherein the at least one output line is coupled to the relay and configured to provide the output voltage to the relay.

16. A method for providing DC power within a UPS system comprising an input configured to be coupled to an AC power source, and a transformer including a first primary winding configured to be coupled to the AC power source, a second primary winding configured to be coupled to a DC power source, and at least one secondary winding coupled to at least one output line, the method comprising:
monitoring a level of input AC power at the input;
determining, with a sense circuit coupled to the input, whether the level of input AC power is above an input power threshold;
coupling, in a first mode of operation of the UPS, the input to the first primary winding in response to a determination by the sense circuit that the input AC power is above the input power threshold;
decoupling, in a second mode of operation of the UPS, the input from the first primary winding in response to determination by the sense circuit that the input AC power is below the input power threshold;
controlling current, in the first mode of operation of the UPS, from the AC power source through the first primary winding to generate an output voltage at the at least one output line; and
controlling current, in the second mode of operation of the UPS, from the DC power source through the second primary winding to generate the output voltage at the at least one output line.

17. The method of claim 16, further comprising adjusting a current limit of the transformer in the second mode of operation of the UPS.

18. The method of claim 16, wherein the UPS system further comprises a converter coupled to the input, an inverter coupled to the converter via a DC bus, and a battery charger coupled to the DC bus, wherein the DC power source is a battery coupled to the battery charger, and wherein the method further comprises:
monitoring a level of voltage provided by the battery and the battery charger to the second primary winding;
determining whether the level of voltage provided by the battery and the battery charger to the second primary winding is above a DC voltage threshold; and
operating the UPS in the second mode of operation in response to a determination that the level of voltage provided by the battery and the battery charger to the second primary winding is above the DC voltage threshold.

19. The method of claim 18, further comprising:
operating the UPS in a third mode of operation in response to a determination that the level of voltage provided by the battery and the battery charger to the second primary winding is below the DC voltage threshold; and
controlling, in the third mode of operation of the UPS, current from the DC bus through the first primary winding to generate the output voltage at the at least one output line.

20. An Uninterruptible Power Supply (UPS), the UPS comprising:
an input configured to be coupled to an AC mains supply;
a converter coupled to the input;
an inverter coupled to the converter with a DC bus;
a battery charger coupled to the DC bus;
a DC power source coupled to the battery charger;
a transformer coupled to the AC mains supply, the DC power source, and the DC bus; and
means for selecting one of the AC mains supply, the DC power source, and the DC bus to provide power to the transformer and for generating an output DC voltage with the transformer based on the power received from the selected one of the AC mains supply, the DC power source, and the DC bus.

* * * * *